UNITED STATES PATENT OFFICE.

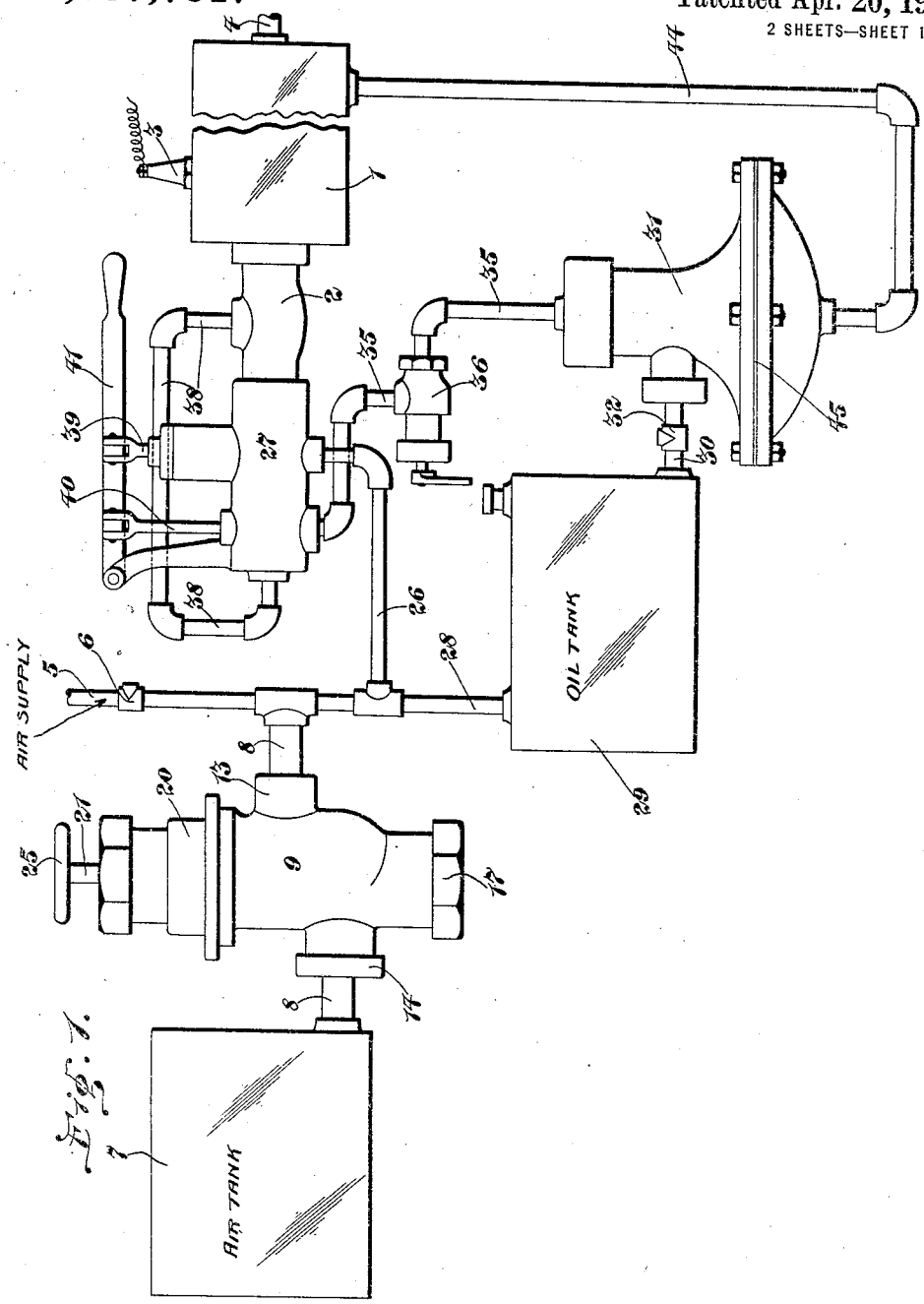

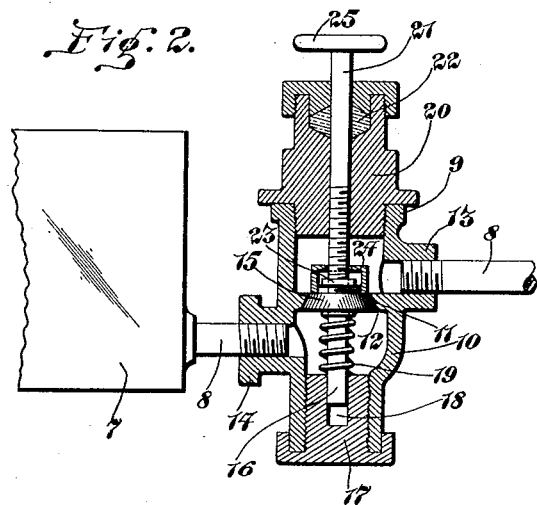
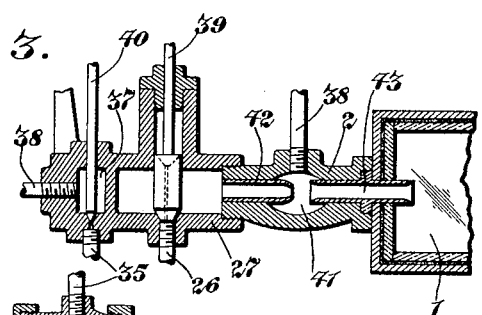
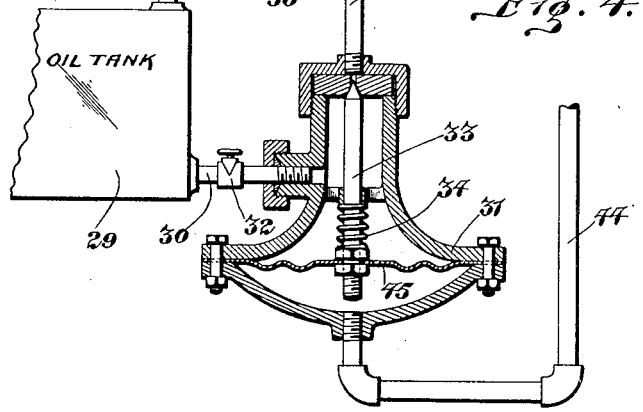

JOHN O. CARREY, OF ST. LOUIS, MISSOURI, ASSIGNOR TO CARREY ROTARY ENGINE COMPANY, OF ST. LOUIS, MISSOURI, A CORPORATION OF MISSOURI.

PRESSURE-GENERATING SYSTEM.

1,337,751. Specification of Letters Patent. Patented Apr. 20, 1920.

Application filed June 7, 1919. Serial No. 302,574.

*To all whom it may concern:*

Be it known that I, JOHN O. CARREY, a citizen of the United States, residing at St. Louis, Missouri, have invented a new and useful Pressure - Generating System, of which the following is a specification.

This invention relates to improvements in pressure generating systems, and consists in the novel construction, arrangement and combination of parts hereinafter described.

An object of the invention is to provide in a pressure generating system, means whereby an initial compression is created in a combustion chamber in starting the operation of the system.

Another object of the invention is to provide automatic means for controlling the supply of fuel and air to a combustion chamber by pressure generated in the combustion chamber, so that the supply will be coördinated with the requirements for the fuel and air in maintaining a predetermined pressure in the combustion chamber.

With the foregoing general objects as well as specific advantages and objects attainable from the invention in view, I have designed the system as hereinafter described reference being made to the accompanying drawings, in which—

Figure 1 is an assembled view of the various elements of the system embodying the invention.

Fig. 2 is a sectional view showing the control valve in the passage leading from the air pressure tank.

Fig. 3 is a sectional view illustrating particularly the control of the fuel and air as it enters the combustion chamber.

Fig. 4 is a sectional view through the valve mechanism controlling the pressure from the combustion chamber, whereby the fuel supply is regulated.

In the embodiment of the invention as illustrated in the drawing pressure is generated in the combustion chamber 1. As the construction of the combustion chamber is the subject-matter of a copending application filed by me April 26, 1919, Serial No. 292,935, it is unnecessary at this time to describe it further than to say that the chamber is designed to stand a high degree of heat and that the fuel liquid and air are mixed in a nozzle 2 and initially exploded within the chamber by an ignition device 3. An outlet passage 4 from the combustion chamber conducts the pressure to the point of use either for the operation of an engine or for other purposes.

Air is supplied to the nozzle 2 from an air supply passage 5. The air passes through a check valve 6 in the air supply passage and is conducted to an air pressure tank 7 through a conduit 8 in which is located a valve 9. The valve 9 is of special construction and comprises a valve case 10 having a transverse partition wall 11 therein in which is formed a valve seat 12. One branch of the air conduit 8 enters the valve case 10 above the partition through a threaded boss 13, and the other branch of the air conduit 8 which leads directly into the air storage tank enters the valve case through a threaded boss 14.

A puppet valve comprising a valve head 15 and a valve stem 16 is mounted in a cap 17 threaded into the bottom of the valve case, said cap having a recess 18 therein, in which the end of the valve stem operates. An expansion spring 19 encircles the valve stem between the head and the inner end of the cap, the tendency of the spring being to actuate the valve to closed position. Threaded into the top of the valve case is a cap 20 having a central opening therethrough in which a threaded stem 21 is mounted. The head of the cap surrounding the stem is provided with a packing gland 22 which prevents the escape of pressure between the stem and the threaded opening. The inner end of the stem 21 is enlarged to form a flange 23. The end of the stem 21 and the flange 23 extend within a hollow boss 24 on the valve head. Thus as the stem 21 is raised and lowered by means of a hand wheel 25, the valve head may be moved from its seat and held on its seat, or remain free to be moved by the pressure through the valve.

The valve 9 is constructed for three adjustments. One a back pressure valve adjustment for admitting and maintaining a pressure in the auxiliary supply tank for use principally in starting operations; another adjustment for releasing the pressure from the auxiliary supply tank into the air supply for the air and fuel mixing device; and a third adjustment for retaining the air pressure created in the auxiliary tank.

In generating an initial pressure of air in the pressure tank 7 the valve stem 21 is screwed to a neutral position so that the flange 23 will be in the intermediate position. The pressure then is forced through the valve into the storage tank, the valve acting as a check valve. By screwing the stem 21 to its lowest position the valve is opened and the air pressure flows from the storage tank through the valve in the opposite direction and into a branch air passage 26 from whence it flows into a valve case 27 of the air and fuel mixing device. A pressure also flows through a passage 28 into the top of a fuel liquid tank 29. The fuel liquid is forced from the tank 29 under pressure through a passage 30 into a diaphragm needle valve 31, there being a back check valve 32 intermediate the tank and the diaphragm needle valve 31. The diaphragm needle valve 31 is arranged so that the needle valve stem 33 is normally held open by means of the spring 34 so that there will be a free passage of the fuel liquid into the pipe 35 when pressure is introduced into the fuel liquid tank. The pipe 35 has therein a hand-controlled needle valve 36 for independently controlling the passage of fuel through the fuel supply pipe 35. The fuel supply pipe 35 enters a fuel valve chamber 37 in the mixing device. A passage 38 leads from the fuel valve chamber into the mixing nozzle 2.

The flow of the air and fuel is jointly controlled by the valves 39 and 40 respectively, which are operated by a lever 41. When the lever 41 is raised the valves are opened and there will be a flow of air through the nozzle 2, the air entering the mixing chamber 41 of the nozzle through an injector 42 and the fuel entering through the passage 38. The rush of air through the injector 42 serves to draw the fuel into the mixing chamber 41 of the mixing nozzle and the mixture is forced under pressure through a tube 43 into the combustion chamber, where it is initially igniated as heretofore described.

After a predetermined pressure has been generated in the combustion chamber, there will be a back pressure through a passage 44 which enters the lower part of the diaphragm needle valve 31 and acts against the diaphragm 45 of that valve to move the stem 33 of the needle valve to closed position against the tendency of the spring 34. Thus when a predetermined pressure has been attained in the combustion chamber the supply of fuel is shut off. When the pressure thereupon is reduced in the combustion chamber the diaphragm needle valve will automatically open to permit the continuation of the flow of fuel to the mixing device.

The following will explain the operation of the system. Initially pressure generated from any suitable source is admitted through the air supply passage 5, passing through the check valve 6 into the valve 9, the valve 9 being adjusted to act as a back-pressure check valve. Thus an air pressure is created in the tank 7. After a predetermined pressure has been attained in the tank 7, the valve 9 is adjusted by screwing the stem 21 to its lower position so that the pressure from the tank 7 will be introduced into both the passages 26 and 28. From the passage 26 the pressure enters the air chamber of the air and fuel mixing device when the end of the passage is opened. The pressure from the passage 28 enters the fuel liquid tank, forcing the liquid under pressure through the passage 30 and the check valve 32 to the diaphragm needle valve, hence it flows into the passage 35, being controlled in its passage therethrough by the valve 36. From the passage 35 the fuel liquid enters the fuel chamber of the air and fuel mixing device when the valve 40 is opened. After the air and fuel pressure has been created the lever 41 is raised, admitting the supply of air and fuel which flow into the mixing nozzle 2, from whence they are forced under pressure into the combustion chamber. The mixture of air and fuel under pressure is initially ignited by the ignition device 3.

After the combustion has been started in the combustion chamber the valve 9 may be closed and the pressure supplied direct from the air supply passage 5. The supply of fuel is controlled by the back pressure in the passage 44 acting upon the diaphragm valve in the manner heretofore described.

I am aware that the construction may be varied in details without departure from the spirit and scope of the invention.

What I claim and desire to secure by Letters Patent, is:—

1. In an air pressure generating system, the combination of an air supply and an auxiliary air pressure tank in communication with said air supply, of a valve between said air supply and said pressure tank, operable to control the pressure for inducing the pressure in said tank, and to release the air from said tank, a fuel liquid tank, a fuel valve controlling the passage of fuel from said fuel liquid tank, an air valve controlling said air supply, a mixing nozzle for receiving and mixing the air and fuel admitted thereto by said last-named fuel and air valves, and a combustion chamber in connection with said air chamber and nozzle.

2. A pressure generating system, comprising an air supply, and air pressure tank in communication with said air supply, a valve between said air supply and said pressure tank operable to control the pressure for inducing a pressure in said tank and to release the air from said tank, a fuel liquid tank, an air valve, a fuel valve, a passage from said air tank for supplying air to said air valve, a passage from said fuel liquid tank for supplying fuel to said fuel valve, means for controlling said air and fuel valves to simultaneously release the supply of air and fuel therefrom, a mixing nozzle for receiving and mixing the air and fuel from said valves, a combustion chamber in communication with said fuel and air nozzle, and means for igniting the mixture induced in said combustion chamber.

3. In a pressure generating system, the combination with a combustion chamber, of a main air supply therefor, an auxiliary air supply for storing air pressure induced therein from the main air supply, a fuel supply, an air valve, a fuel valve, a fuel and air nozzle in communication with said air and fuel valves, a valve for controlling the pressure from said storage tank, whereby the fuel and air may be supplied to said fuel and air valves under pressure, and means for simultaneously releasing the supply of air and fuel into said air and fuel nozzle whereby a mixture of air and fuel is induced to said combustion chamber.

4. In a pressure generating system, the combination of a combustion chamber, with an air nozzle in communication with the combustion chamber for inducing a mixture into said chamber, an air supply for said nozzle, a fuel supply for said nozzle, said fuel supply comprising a fuel liquid tank, an air pressure conduit in communication with said tank, a diaphragm valve in the fuel supply operable to release the fuel into said fuel supply and to close said valve after a pre-determined pressure has been attained in the combustion chamber.

5. A pressure generating system, comprising an air supply passage, an auxiliary air pressure tank, a valve between said air supply passage and said air pressure tank operable to admit and retain a pressure in said tank, and to release the pressure therefrom, an air valve, a fuel valve in communication with the fuel supply, means for releasing the supply of air and fuel from said valves, an air and fuel nozzle in communication with said valves, and a combustion chamber in communication with said air and fuel nozzle.

6. In a pressure generating system, a combustion chamber, a fuel and air nozzle in communication with the combustion chamber for inducing a mixture into the combustion chamber, an air supply for said nozzle and a fuel supply for said nozzle, said fuel supply comprising a fuel liquid tank, means for inducing an air pressure in said tank, an automatically controlled valve in the fuel supply, a manually controlled valve for regulating the passage of fuel through said fuel supply valve, and a combustion chamber for receiving the mixture of air and fuel from said supply passages.

7. In a pressure generating system, the combination with a combustion chamber, an air pressure tank, an air supply passage for said pressure tank, means between the air supply passage and the air pressure tank operable to admit and retain the pressure in said air pressure tank, and to release the pressure therefrom, a fuel and air mixing nozzle, a main air supply independent of said air tank leading to said nozzle, a fuel supply in communication with said nozzle, a combustion chamber for receiving the mixture from said nozzle, and means for co-ordinately controlling the relative quantities of fuel and air passing into said air and fuel nozzle.

8. In a pressure generating system, a combustion chamber, a fuel and air nozzle for supplying a mixture of fuel and air to said combustion chamber, an air supply for said nozzle, a fuel supply for said nozzle including a fuel liquid tank, an air pressure passage for creating a pressure in said tank, an automatic regulating valve for controlling the passage of fuel liquid from said tank to said air and fuel mixing nozzle, a check valve for preventing back pressure of the fuel into said tank, and a manually controlled valve for regulating the quantity of mixture passing from said tank to the air and fuel mixing nozzle.

9. In a pressure generating system, a combustion chamber, a fuel and air mixing device, a fuel tank, an air pressure tank, means for controlling the pressure from said air pressure tank, whereby air and the fuel are conducted to said air and fuel mixing device under pressure, means for igniting the mixture released from said air and fuel mixing device into said combustion chamber and an independent air supply adapted to supply air under pressure to said mixing device.

10. In a pressure generating system, a combustion chamber, a fuel and air mixing device, a fuel tank, an air pressure tank, means for controlling the pressure from said air pressure tank, whereby air and the fuel are conducted to said air and fuel mixing device under pressure, an independent air supply in communication with said air and fuel mixing devices and with said air tank, means for igniting the mixture released from said air and fuel mixing device into said combustion chamber, and a device under influence of the pressure in said combustion chamber whereby the supply of fuel will be regulated in accordance with the pressure in the combustion chamber.

11. In a pressure generating system, a combustion chamber, a fuel and air nozzle for supplying a mixture of fuel and air to said combustion chamber, an air supply for said nozzle, a fuel supply for said nozzle including a fuel liquid tank, an air pressure passage for creating a pressure in said liquid tank, an automatic regulating valve for controlling the passage of fuel liquid from said tank to said air and fuel mixing nozzle, and a check valve for preventing back pressure of the fuel into said tank.

12. In a pressure generating system, the combination of a fuel and air mixing nozzle, valves jointly operable to admit fuel and air to said nozzle, a main air supply line in communication with said air valve, a fuel liquid tank in communication with said fuel valve, an air conduit in connection with said air supply leading to said tank, an auxiliary tank in communication with the main air supply line, a valve between said air supply line and said tank, means for adjusting said valve for opening and closing the same, and for regulating said valve for automatic operation whereby a pre-determined pressure may be created in said auxiliary tank.

13. In a pressure generating system, the combinaion of a main air supply, and an auxiliary air pressure tank in communication with said air supply, a valve between said air supply and said pressure tank operable to control the pressure for inducing a pressure in said tank, and to release the pressure from said tank, a fuel liquid tank, an air valve, a fuel valve, a passage from said air tank for supplying air to said air valve, a passage from said liquid tank for supplying fuel to said fuel valve, a double acting release for releasing the air and fuel from said valves, a mixing nozzle for receiving the air and fuel from said valves, and a combustion chamber in communication with said air and fuel nozzle.

14. In a pressure generating system, the combination with a combustion chamber, and an air mixing nozzle in communication with said chamber for inducing a mixture into said chamber of an air supply for said nozzle, a fuel supply for said nozzle, said fuel supply comprising a fuel liquid tank, an air supply for generating a pressure in said fuel liquid tank, an automatically controlled valve in said fuel supply, a separate manually controlled valve for regulating the passage of fuel through said fuel supply valve, and a check valve in said fuel supply for preventing back pressure in said liquid tank.

JOHN O. CARREY.